United States Patent
Shaw et al.

(10) Patent No.: US 10,384,874 B1
(45) Date of Patent: Aug. 20, 2019

(54) BRAKING AND LOCKING SYSTEM

(71) Applicant: Anderson Industries LLC, Webster, SD (US)

(72) Inventors: Nicholas Shaw, West Fargo, ND (US); Daniel Geiger, Fargo, ND (US); Daniel Ewert, Lake Park, MN (US); Joel Jorgenson, Fargo, ND (US)

(73) Assignee: Anderson Industries LLC, Webster, SD (US)

( * ) Notice: Subject to any disclaimer, the term of this patent is extended or adjusted under 35 U.S.C. 154(b) by 0 days.

(21) Appl. No.: 16/000,323

(22) Filed: Jun. 5, 2018

(51) Int. Cl.
| | | |
|---|---|---|
| *B65G 13/00* | (2006.01) | |
| *B65G 13/075* | (2006.01) | |
| *B60P 1/52* | (2006.01) | |

(52) U.S. Cl.
CPC .............. *B65G 13/075* (2013.01); *B60P 1/52* (2013.01)

(58) Field of Classification Search
None
See application file for complete search history.

(56) References Cited

U.S. PATENT DOCUMENTS

| | | | | |
|---|---|---|---|---|
| 3,621,982 A | * | 11/1971 | Fleischauer | B65G 47/261 198/781.1 |
| 3,923,151 A | * | 12/1975 | Weber | B65G 23/00 198/810.04 |
| 4,096,960 A | * | 6/1978 | Gilmore | A01D 87/121 280/423.1 |
| 7,465,143 B1 | | 12/2008 | Adams | |

* cited by examiner

*Primary Examiner* — Kavel Singh
(74) *Attorney, Agent, or Firm* — Womble Bond Dickinson (US) LLP; Daniel E. Ovanezian

(57) ABSTRACT

A control device is described for rollers of a trailer. Belt supports and belt-end supports attach to the trailer, which has rollers for unloading cargo. The belt is over each of the belt supports and under each of the rollers. A belt tensioner tensions the belt so as to brake the rollers.

18 Claims, 5 Drawing Sheets

Tension on Belt at A or B Applies Friction Brake to Rollers at C

Tension on Belt at A or B Applies Friction Brake to Rollers at C

BRAKING AND LOCKING SYSTEM

TECHNICAL FIELD

Aspects and implementations of the present disclosure relate to braking and locking systems.

BACKGROUND

Trailers with roller support have been developed for transporting construction materials from supply sites to job sites. Oversized materials, such as roof trusses, require cranes and similar large systems to load and unload onto trailers, and the cranes may not be available at remote jobsite locations for unloading. To address the issue of unloading oversized materials without the availability of a large crane or similar equipment, trailers with roller supports can be used.

To unload materials using a trailer with roller supports at a job site, the operator first unfastens any straps securing the load to the trailer. Each of the rollers must be unlocked, to allow for rotation. The brakes of the rollers must be loosened, and the front of the trailer bed is lifted to provide an incline towards the rear of the trailer. As the material begins to move across the rollers, the operator may adjust the braking tension of the rollers to retard the movement and slow the motion of the material. This braking action is provided to prevent the material from rolling off the trailer at a speed that might cause damage to the building material or objects at the job site.

Traditional braking systems use pneumatic powered brake shoes underneath one end of the rollers. A manual valve controls the amount of air leaving the pneumatic source, which then moves the brake pads from an unengaged position to engaging the bottom side of the rollers. The pneumatic braking system utilizes pneumatic systems likely to be available on the trailer, but the braking system adds considerable weight and cost to the roller trailer.

The locking system is separate from the pneumatic braking system, using mechanical pins that protrude through holes in each of the rollers to prohibit the rotation of the rollers. The locking system is used to prevent the rotation of the rollers in transport. The pin lock system suffers from faults if debris during the transportation phase interferes with the locks being extracted from the rollers. There is a need in the art for a solution which overcomes the drawbacks described above.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Embodiments of a control (e.g., braking and locking) system for the roller supports of material trailers are described herein. Features in various combinations in various embodiments include a belt, which is a generally non-stretchable strap in some embodiments, brake pad inserts, and a movable tensioner that adjusts the tension of the strap across the rollers of the trailer. The braking and locking system replaces traditional pin locks and pneumatic braking systems with a singular system that combines the functions into a simple braking and locking mechanism. In one embodiment, a single lock and braking system is presented, overcoming the issues of conventional systems. A combined lock and braking system improves efficiency, reduces weight, reduces cost, and is simpler to operate. An electronics module combines all of the roller trailer functions of releasing pin locks, managing braking actions, and tilting the lift bed autonomously, providing safe unloading of the transported materials, in some embodiments.

Figure 1:
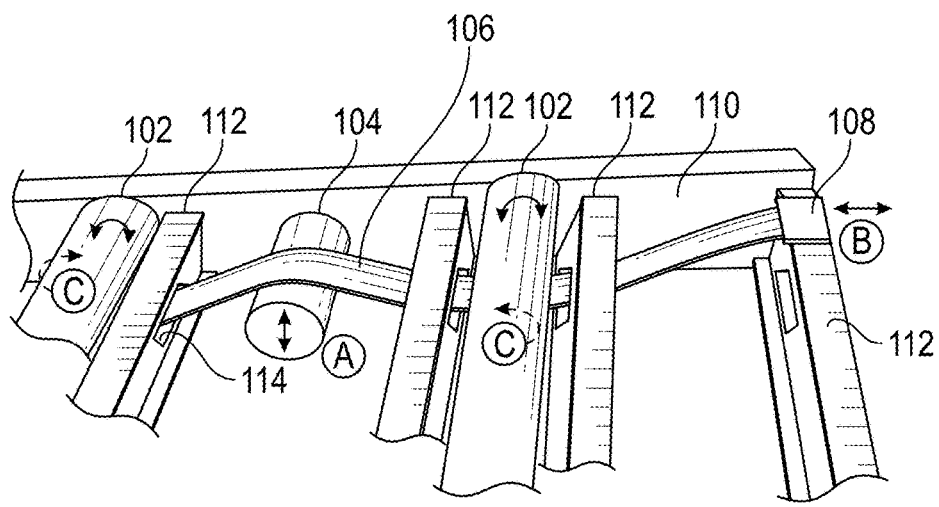
FIG. 1 is a perspective view of a belt acting as a friction brake to rollers of a trailer, in an embodiment of a braking and locking device.

A continuous non-elastic webbed belting is stretched beneath each of the rollers, with belt supports between the roller supports to provide a vertical rise to the belting (see FIG. 1). Allowing slack in the belting provides a small separation between the belting and the roller, allowing the roller to rotate without interference or resistance, or with reduced resistance.

Adding a force to the webbed belting to tension the belt lifts the belting to the bottom of the roller surface. With sufficient force, the belting becomes taut beneath the roller, and the resulting frictional force between the webbed belting and the roller provides resistance to the roller, inhibiting rotation.

Force may be applied to the belting in three embodiments: a linear force applied in parallel with the longitudinal axis of the trailer, a linear force applied vertically to the belting, or a rotational force spooling the webbed belting. Each of these embodiments provides a mechanism to inhibit rotation of the rollers for both locking and braking. Various mechanical, electrical, hydraulic, pneumatic, and magnetic systems may be used to provide the force applied for webbed belt tensioning.

The braking and locking system may also be considered persistent, if the tension remains applied to the webbed belting with no power applied or energy expended. This characteristic may be important during transportation, storage, or during other times.

FIG. 1 is a perspective view of a belt 106 acting as a friction brake to rollers 102 of a trailer, in an embodiment of a braking and locking device. Only a corner of the trailer bed is shown, with a slotted cover (see FIG. 2) removed. Rollers 102 in the trailer are attached, for example with bearings and bearing mounts, to longitudinal side beams 110 of the tiltable trailer bed as is known in the industry. The rollers 102 are transverse to the trailer bed and parallel to transverse beams 112 of the trailer bed. A belt support 104 is mounted between two of the rollers 102, for example to the side beam 110, and is made of low friction material (e.g., polished metal, low friction coating in some embodiments. The belt 106 is arranged in a serpentine manner over each belt support 104 and under each roller 102, with rollers 102 and belt supports 104 interleaved. When and where needed for clearance, the belt 106 passes through slots 114 in the transverse beams 112. Alternatively, the belt 106 could pass over or under a transverse beam, depending on how the trailer and trailer bed are constructed. This serpentine, alternating up/down arrangement for the belt 104 gives a good wrapping angle and good wrapping coverage for the belt 106 relative to the roller 102, for improved frictional contact as compared to a flat layout of the belt 106.

Applying tension on the belt in an upward direction at point A, for example by moving the belt support 104 upwards, applies the belt 106 as a friction brake to the rollers 102 at point C (underneath in the drawing, where the belt 106 contacts the roller 102). In various embodiments, one or multiple belt supports 104 are movable as a belt tensioner, which could be actuated by hydraulics, pneumatics, solenoid, electric motor (e.g. with gears), etc. In such embodiments, opposing belt end portions 108, each for example an end piece, end loop or other section of the belt past the last roller 102 at a respective end of the trailer bed, are attached with belt-end supports to the trailer. This can be accomplished with fasteners, a bracket, etc., and may be adjustable in some embodiments to compensate for belt stretch and wear.

Alternatively, applying tension on the belt in a longitudinal direction at point B, for example by pulling on one or both opposing belt end portions 108, applies the belt 106 as a friction brake to the rollers 102 at point C (again, underneath where the belt 106 contacts the roller 102). In such embodiments, the belt supports 104 are mounted in fixed arrangement to the trailer bed, or could be adjustable in further embodiments.

Figure 2:
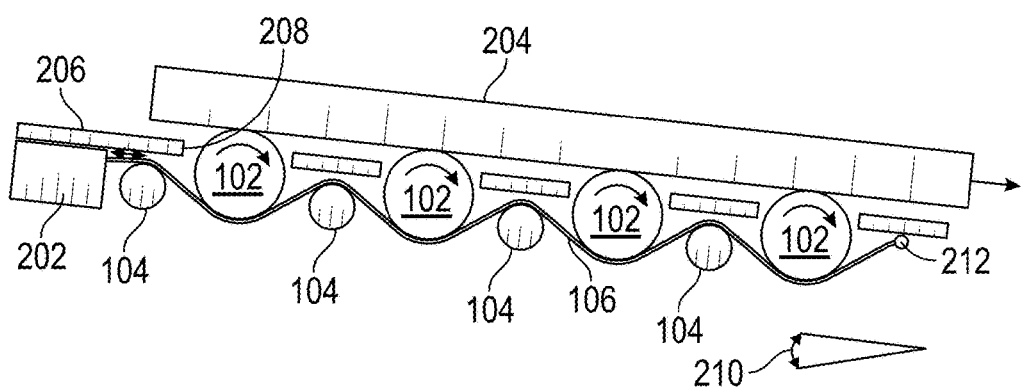
FIG. 2 is a side view depicting a belt tensioner applying tension to the belt, which applies braking action to the rollers of the trailer and slows or stops cargo being unloaded with the trailer bed tilted at a tilt angle, in one embodiment.

FIG. 2 is a side view depicting a belt tensioner 202 applying tension to the belt 106, which applies braking action to the rollers 102 of the trailer and slows or stops cargo 204 being unloaded with the trailer bed tilted at a tilt angle 210, in one embodiment. A slotted cover 206 is in place to protect the belt 106 and belt supports 104 from damage through contact with the cargo 204, while the slots 208 of the slotted cover 206 allow the rollers 102 to protrude through the slots 208 so that the cargo 204 can ride on the rollers 102. In one embodiment, individual covers may be used for each individual belt support. One end of the belt 106 is attached by a belt-end support 212 to the trailer, e.g., to the tiltable trailer bed. The other, opposed end of the belt 106 is pulled, i.e. tensioned, by the belt tensioning device 102, to apply braking action, and released, or pushed, in either case de-tensioned by the belt tensioning device 102, to release braking action. In various embodiments, either end of the belt 106 could have the belt tensioner 202, and, further, either end of the belt 106 or associated mounting could be adjustable to compensate for stretch or wear. In some versions, the belt 106 is detachable, for replacement of a worn belt 106.

Figure 3:
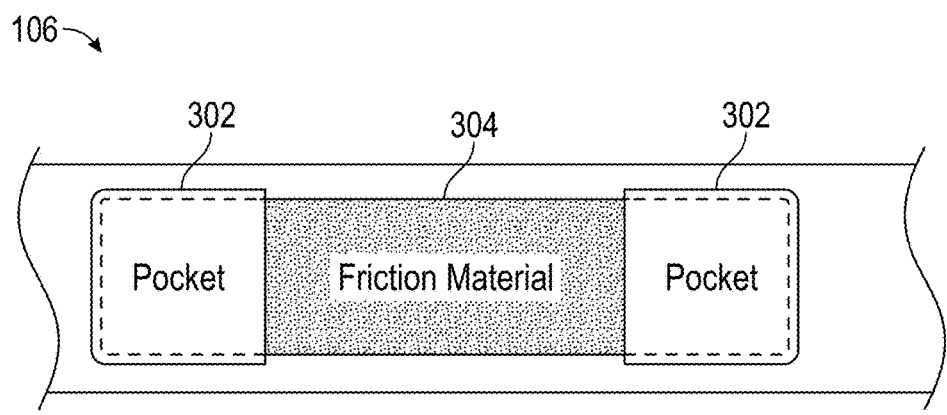
FIG. 3 is an overhead view of a section of the belt with friction material inserted into pockets, in one embodiment.

FIG. 3 is an overhead view of a section of the belt 106 with friction material 304 inserted into pockets 302, in one embodiment. The pockets 302 could be sewn on to webbing to form the belt 106. Bending the friction material 304 after inserting one end into a pocket 302 allows insertion of the other end of the friction material 304 into the other pocket 302. After that, the friction material can be straightened to seat in both pockets 302. With reference back to FIGS. 1 and 2, the region between each pair of pockets 302 should align with one of the rollers 102, so that each of the rollers 102 has a section of the belt 106 with friction material 304 to apply braking action to the roller 102 at point C.

Figure 4:
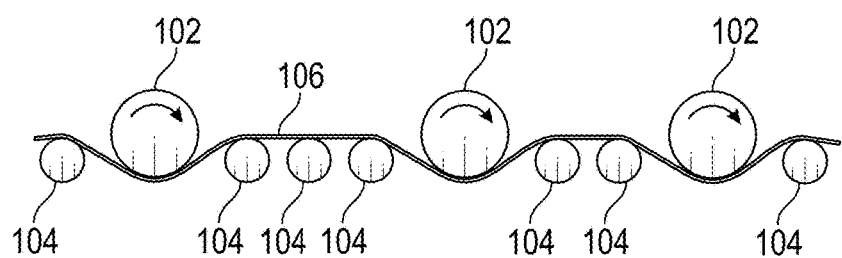
FIG. 4 is a side view of alternative arrangements of rollers and belt supports for the belt, in various embodiments.

FIG. 4 is a side view of alternative arrangements of rollers 102 and belt supports 104 for the belt 106, in various embodiments. Belt supports 104 could be various sizes, larger or smaller. One or more belt supports 104 could be between two rollers 102. Rollers 102 can be closer together or farther apart. It may be advantageous to have belt supports 104 closer to rollers 102, for increased wrap angle and resultant increased frictional contact area of belt 106 to roller 102, or farther from rollers 102 for improved release of braking action. If rollers 102 are spaced farther apart, it may be advantageous to have multiple belt supports 104 between each pair of rollers 102, so that the belt does not sag overly when released. Elevation of belt supports 104 relative to rollers 102 is another consideration, for sufficient clearance of belt 106 relative to the slotted cover 206 (see FIG. 2) in a trade-off with wrap angle.

Figure 5A:
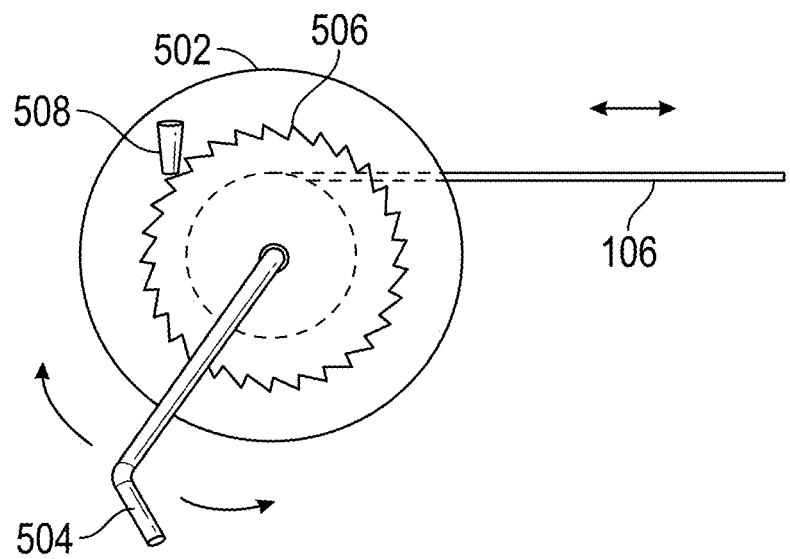
FIG. 5A depicts a hand-cranked ratcheting spool as one embodiment of a belt tensioner.

FIG. 5A depicts a hand-cranked ratcheting spool 502 as one embodiment of a belt tensioner 202. Also known as a hand-operated winch, this type of equipment is seen with boat trailers among other applications. Turning the handle 504 by hand rotates the spool 502, to tension or reel in a portion of the webbing 106. A pawl 508 engages a tooth of a ratchet 506, to hold tension on the webbing 106. The pawl 508 is released, by hand, to release tension on the webbing 106. Turning the handle 504 in the opposite direction from that of tensioning the webbing 106 assists the release of tension.

Figure 5B:
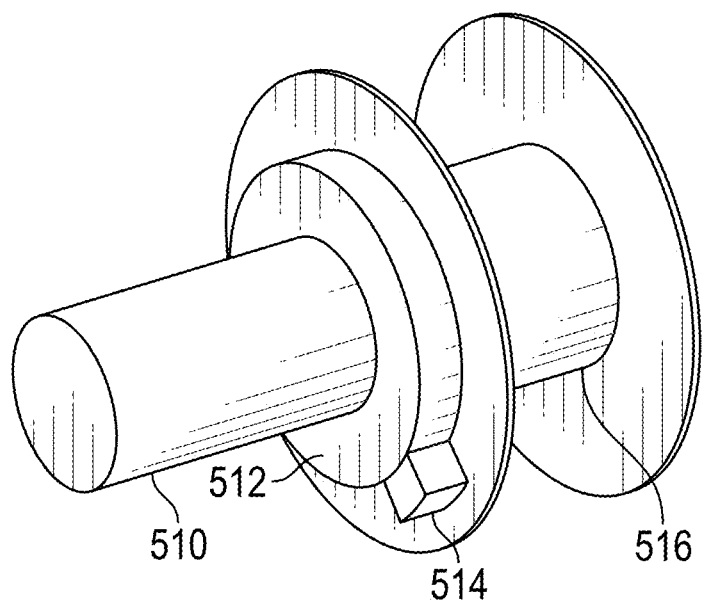
FIG. 5B depicts a winch with a winch brake and solenoid actuator as one embodiment of a belt tensioner.

FIG. 5B depicts a winch with a winch brake 512 and solenoid actuator 514 as one embodiment of a belt tensioner 202. A winch motor 510, which could be electric, hydraulic, or air pressure or vacuum operated, turns the spool 516 to tension or reel in a portion of the webbing 106, or release tension. In some winches, the solenoid actuator 514 actuates the winch brake 512 when power is removed from the winch motor 510.

In some versions, the winch brake 512, or alternatively a ratchet and pawl mechanism, holds tension on the webbing 106. In further versions, resistance of the motor and gears of the winch to motion with the winch depowered retains tension on the belt and resultant braking of the rollers 102. This could be due to internal friction, or residual alignment with magnets (e.g., in a permanent magnet motor).

Figure 6:
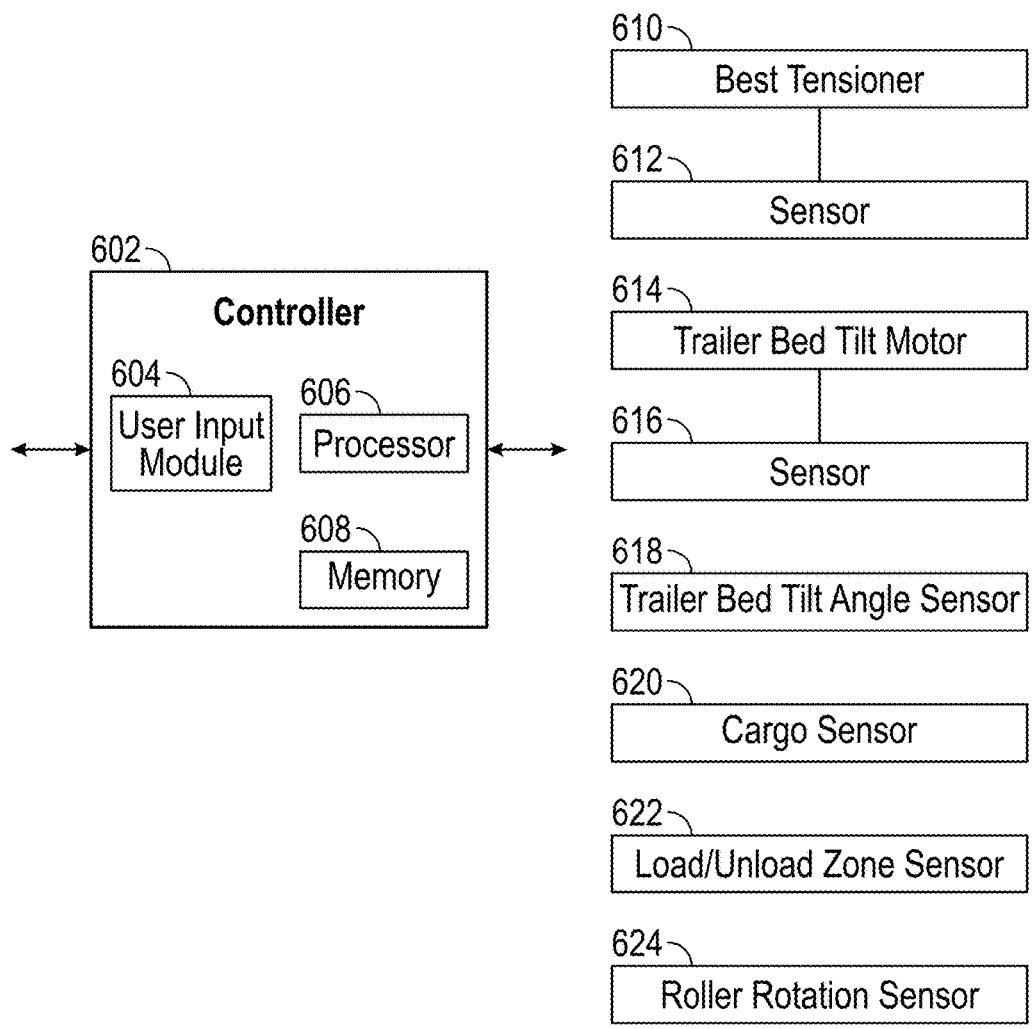
FIG. 6 is a block diagram of a controller and sensors for controlling the belt tensioner and the trailer tilt motor, in one embodiment.

FIG. 6 is a block diagram of a controller 602 and sensors 612, 616, 620, 622, 624 for controlling the belt tensioner 610 and the trailer bed tilt motor 614, in one embodiment. A processor 606 and memory 608 in the controller 602 hold and execute software that programs the controller 602 to input from the sensors and the user input module 604 and operate motors and/or actuators of the system. User input could be through any of a variety of user interfaces, from buttons and levers to multiaxis joysticks, smart phone interface through Bluetooth, touchscreen, touchpad, touch strip, voice activation, gesture recognition, etc. Since controllers, user interfaces, I/O, etc. are well known, these are not further described herein and embodiments are not limited to the specific depiction of FIG. 6. Sensors too, are widely known, and could include ones for optical, audio, sonar, radar, imaging (e.g., cameras and image recognition), position encoders, rotation encoders, voltage, current and other measurements and other types not described herein.

Referring to FIGS. 1, 2 and 6, in one scenario the user directs the controller 602 to tilt the trailer bed and unload the cargo 204 at a specified rate (for example in centimeters or inches per second or feet or meters per minute). The controller directs the trailer bed tilt motor 614 to tilt the trailer bed to a specified angle, which is monitored by the trailer bed tilt angle sensor 618 while also monitoring the action of the trailer bed tilt motor 614 through a sensor 616. When the trailer bed reaches the specified angle, the controller directs the belt tensioner 610 to release tension on the belt 106, as monitored by the sensor 612. The controller 602 monitors the cargo through the cargo sensor 620 and monitors the rotation of the rollers 102 through the roller rotation sensor 624, adjusting tension on the belt 106 through the belt tensioner 610 as the unloading proceeds too slowly, too quickly or within a specified safety range. The controller 602 also monitors the loading and unloading zone through the load/unload zone sensor 622, applying tension to the belt 106 to slow or stop the rollers 102 if there is an unsafe condition (e.g., a person, animal or vehicle entering the unloading zone). Further scenarios and controller operation with further conditions, for unloading or loading are readily devised in keeping with the teachings herein. Variations with fewer sensors, other sensors, or more sensors, further functions, and integration with other controllers are also envisioned.

Figure 7:
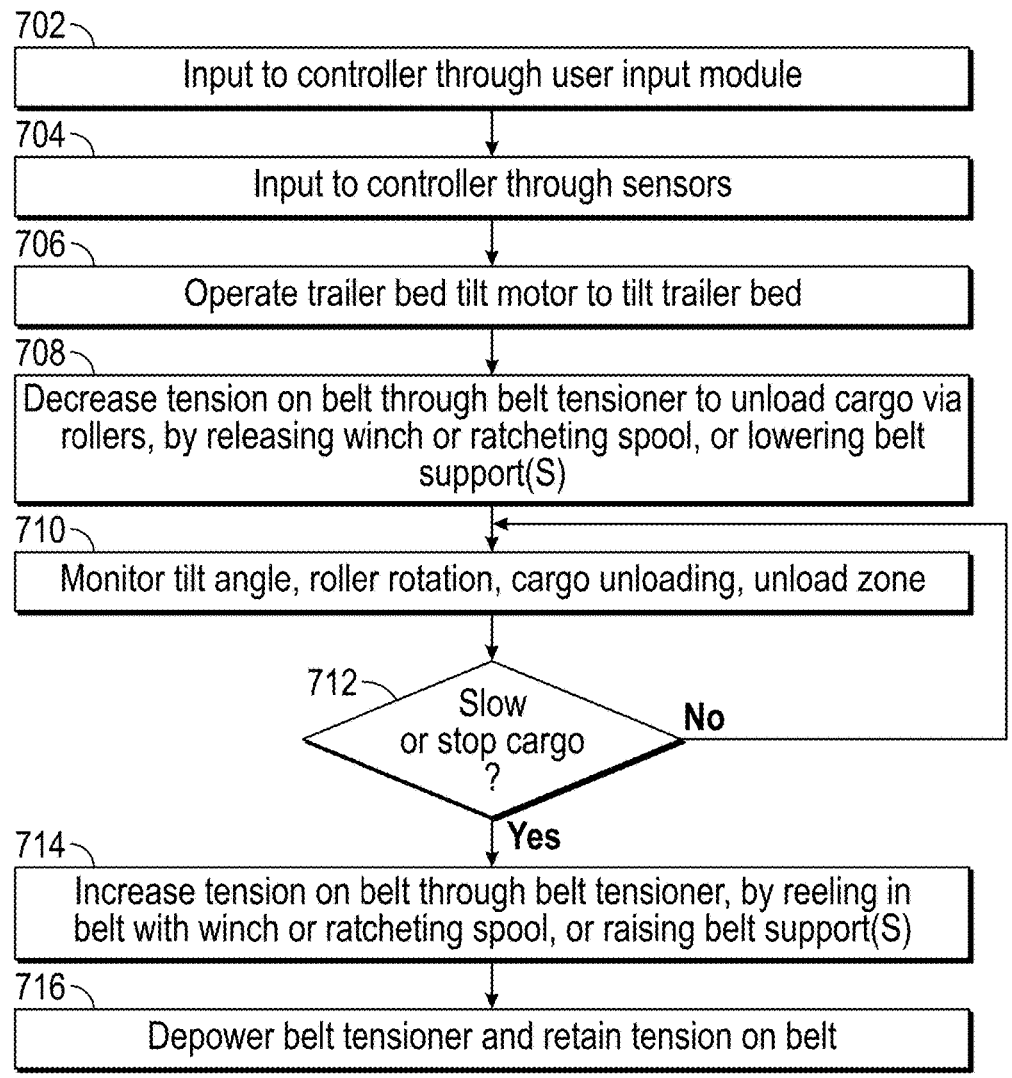
FIG. 7 is a flow diagram of a method of braking rollers of a trailer, which can be practiced with or by various embodiments.

FIG. 7 is a flow diagram of a method of braking rollers of a trailer, which can be practiced with or by various embodiments. Subsets and rearrangements of actions of the method can also be performed, as further embodiments of a method.

In an action 702, there is input to a controller through a user input module. Various user interfaces are possible, including wired, wireless, switch-activated, sensed, communicated locally or remotely, etc. In an action 704, there is input to the controller through sensors. Various sensors could monitor motors or other actuators, operating features, environmental aspects, etc.

In an action 706, the trailer bed tilt motor is operated to tilt the trailer bed. This could be through manual input to the controller, with tilting monitored by an operator, or through monitoring via sensor(s) with the tilting controlled by the controller.

In an action 708, tension on the belt is decreased, through the belt tensioner, to unload the cargo via the rollers. Tension can be decreased in some versions by releasing (or reversing) a winch or releasing a ratcheting spool, and in other versions by lowering one or more belt supports.

In an action 710, tilt angle, roller rotation, cargo unloading and the unload zone are monitored. Monitoring is performed by the controller, using various sensors. In variations, fewer of these are monitored, or more aspects are monitored through additional sensors.

In a determination action 712, it is determined whether to slow or stop the cargo from moving along via the rollers. If the answer is no, the cargo should not be slowed or stopped, flow branches back to the action 710 to continue monitoring. If the answer is yes, the cargo should be slowed or stopped, flow proceeds to the action 714.

In the action 714, tension on the belt is increased through the belt tensioner. Tension can be increased in some versions by reeling in the belt with a winch or a ratcheting spool, and in other versions by raising one or more belt supports.

In an action 716, the belt tensioner is depowered and tension on the belt is retained. In some versions, the motor resists motion when depowered, and this is sufficient to retain tension on the belt. In other versions, there is a winch brake that is automatically actuated when the winch is depowered. In still further versions, there is manual actuation of a brake, ratchet, pin lock, jam or other retention mechanism for the belt tensioner.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of braking rollers of a trailer, comprising:
   decreasing, through a belt tensioner, tension on a belt that is arranged over each of a plurality of belt supports attached to the trailer and arranged under each of a plurality of rollers of the trailer, to unload cargo via the rollers; and
   increasing, through the belt tensioner, the tension on the belt, to brake the rollers and slow or stop the cargo, wherein the increasing the tension on the belt comprises moving one of the plurality of belt supports in a vertical direction.

2. The method of claim 1, wherein the increasing the tension on the belt comprises increasing the tension on the belt with the plurality of belt supports interleaved with the plurality of rollers.

3. The method of claim 1, wherein the increasing the tension on the belt comprises activating a winch to tension the belt.

4. The method of claim 1, wherein the increasing the tension on the belt comprises hand-cranking a ratcheting spool to tension the belt.

5. The method of claim 1, wherein the increasing the tension on the belt comprises pulling the belt at the first or second belt-end support.

6. The method of claim 1, wherein the tension on the belt brakes the rollers through a plurality of friction members comprising brake fabric, each inserted into one Or more pockets of a webbing and aligned with one of the plurality of rollers.

7. The method of claim 1, further comprising:
   inputting to a controller from a plurality of sensors attached to the trailer;
   operating, by the controller, a motor to tilt a trailer bed of the trailer; and
   operating, by the controller, the belt tensioner.

8. The method of claim 1, further comprising:
   depowering a winch, wherein the belt tensioner comprises the winch; and
   applying a winch brake or winch ratchet and pawl, to retain tension on the belt and resultant braking of the plurality of rollers with the winch depowered.

9. The method of claim 1, further comprising:
   depowering a winch, wherein the belt tensioner comprises the winch and wherein a resistance of a motor and gears of the winch to motion with the winch depowered retains tension on the belt and resultant braking of the plurality of rollers.

10. A control device for rollers of trailer, comprising:
    a belt;
    a plurality of rollers;
    a plurality of belt supports disposed between each of the plurality of rollers;
    a first belt-end support attached to a first portion of the belt;
    a second belt-end support attached to a second portion of the belt; and
    a belt tensioner, wherein the belt over each of the plurality of belt supports and under each of the plurality of rollers and the belt tensioner arranged to tension the belt so as to brake the plurality of rollers, wherein the belt tensioner arranged to tension the belt comprises the belt tensioner arranged to move one of the plurality of belt supports in a vertical direction.

11. The control device for rollers of a trailer of claim 10, wherein the plurality of belt supports and the plurality of rollers are arranged to interleave one another.

12. The control device for rollers of a trailer of claim 10, wherein the belt tensioner comprises a winch.

13. The control device for rollers of a trailer of claim 10, wherein the belt tensioner comprises a hand-cranked ratcheting spool.

14. The control device for rollers of a trailer of claim 10, wherein the belt tensioner arranged to tension the belt comprises the belt tensioner arranged to pull the belt at the first or second belt-end support.

15. The control device for rollers of a trailer of claim 10, wherein the belt comprises:
    a webbing having a plurality of pairs of pockets; and
    a plurality of friction members comprising brake fabric, each inserted into one of the plurality of pairs of pockets so as to align one of the plurality of friction members with one of the plurality of rollers of the trailer.

16. The control device for rollers of a trailer of claim 10, further comprising:
    a plurality of sensors, configured to attach to the trailer;
    a controller configured to operate a motor for tilting the trailer bed and operate the belt tensioner based on the input from the plurality of sensors.

17. The control device for rollers of a trailer of claim 10, organized as a retrofit kit for assembly to the trailer.

18. The control device for rollers of a trailer of claim 10, further comprising additional trailer components with the plurality of belt supports and the first and second belt-end supports so attached and the belt and the belt tensioner so arranged.

* * * * *